United States Patent [19]

Gill et al.

[11] 4,185,661

[45] Jan. 29, 1980

[54] SOLENOID OPERATED DIRECTIONAL VALVE WITH DETENT MECHANISM

[75] Inventors: Arthur W. Gill, Saline; Ronald L. Loup, Clarkston; Curtis H. Day, Manchester, all of Mich.

[73] Assignee: Double A Products, Manchester, Mich.

[21] Appl. No.: 934,419

[22] Filed: Aug. 17, 1978

[51] Int. Cl.² .................... F15B 13/044; F16K 31/06
[52] U.S. Cl. ................................ 137/625.65; 251/137; 251/297
[58] Field of Search .................. 137/625.65; 251/137, 251/297

[56] References Cited

U.S. PATENT DOCUMENTS

| | | | |
|---|---|---|---|
| 2,967,545 | 1/1961 | Schmidt | 251/137 X |
| 3,608,586 | 9/1971 | Daggy | 251/297 X |
| 3,799,203 | 3/1974 | Doutt | 251/297 X |
| 3,899,003 | 8/1975 | Tirelli | 251/297 X |

FOREIGN PATENT DOCUMENTS 270419  8/1970  U.S.S.R. .................... 251/137

*Primary Examiner*—Gerald A. Michalsky
*Attorney, Agent, or Firm*—Olsen and Stephenson

[57] ABSTRACT

A solenoid operated directional valve with detent means for retaining the spool of the valve in either of two selected positions, the detent means being operatively associated with the solenoid pins for holding one or the other of the pins in a selected position and thereby for retaining the spool in a selected position in the absence of any direct connection between the detent means and the spool, the detent means further being located out of the flow-passageways of the valve so as to preclude interference with fluid flow and being constructed and arranged to provide detent disengagement forces of uniform low limits and with no side loads applied on the spool, and to contain no loose parts and to have a near infinite life.

7 Claims, 3 Drawing Figures

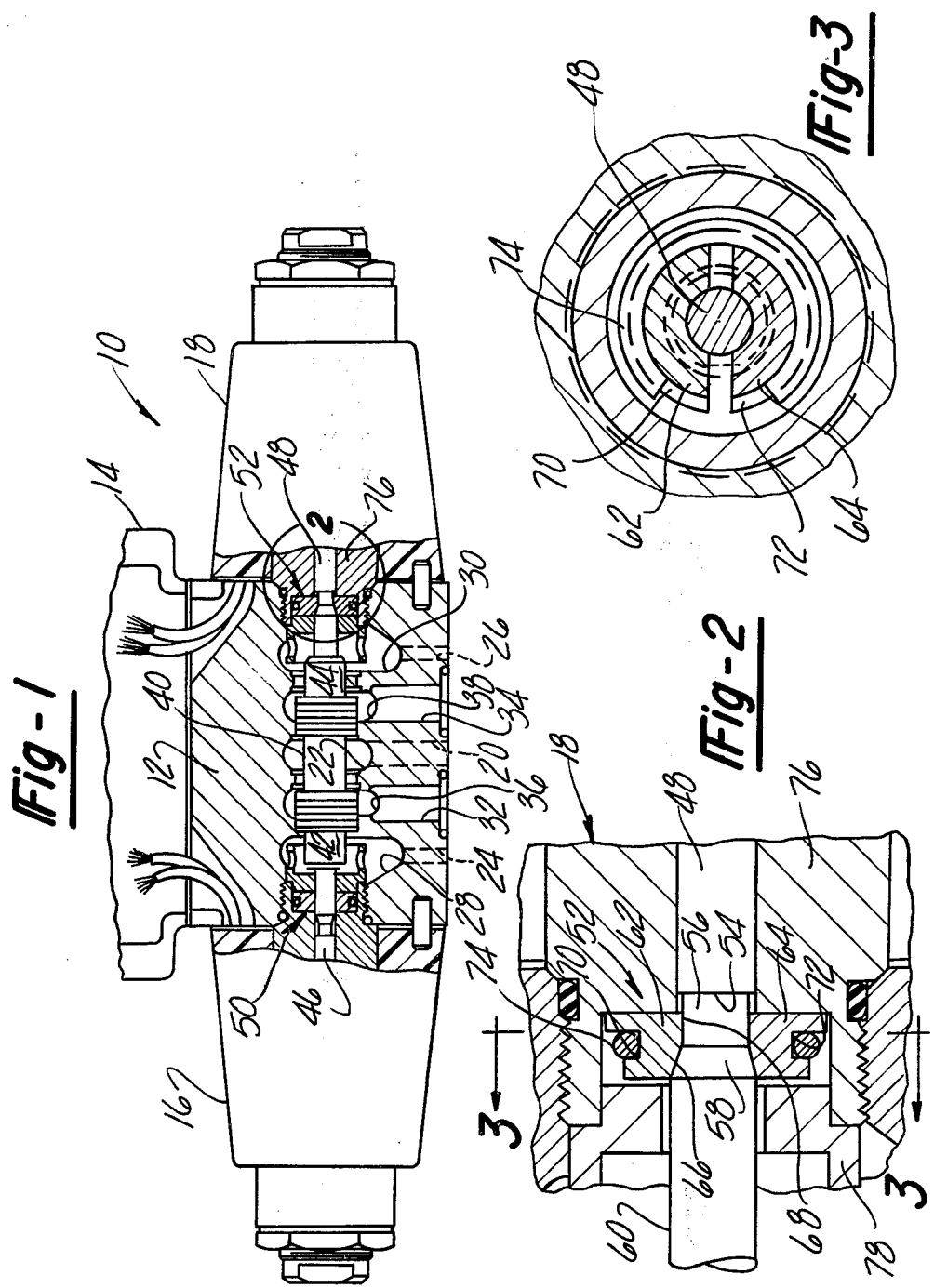

SOLENOID OPERATED DIRECTIONAL VALVE WITH DETENT MECHANISM

TECHNICAL FIELD

The present invention relates to a solenoid operated directional valve which, in response to actuation of a solenoid, has a spool for movement to a desired position for controlling the direction of flow of hydraulic fluid through the valve, and which has detent means for restricting movement of the spool from the desired position after the actuated solenoid has been deenergized.

BACKGROUND ART

Solenoid operated directional valves with detent means are known in the art. These valves have detent means which make direct contact with the spool for holding the spool in a selected position. The spool is moved by a solenoid pin that has been shifted axially in response to the energization of the associated solenoid. To provide holding engagement of the spool by the detent means, it has been the general practice to provide the spool with a cylindrical surface, with or without special grooves, notches, or the like, for engagement by the detent means, and the detent means usually is located in a flow passageway adjacent to the end of the spool for making contact with these surfaces. The known detent means may make point contact with the spools, such as occurs in one structure wherein spring actuated ball-detents are used, or the detent means may make line contact with the spool as is done in a second known prior art structure in which especially shaped spring clips are employed. In a third type of detent means, essentially a line contact is realized wherein an elastomeric ring engages the cylindrical end surface of the spool to hold the latter.

The three types of detent means set forth above are commonly used, but they have numerous inadequacies. Ideally, the detent means should have the following properties: (a) the disengagement force for disengaging the detent means should be substantially constant; (b) the detent means should have an infinite life when compared to the life of the valve; (c) the detent means should not apply a side load on the spool; and (d) the parts of the detent means should be confined so that loose parts are avoided.

In general, the detent means that make point contact with the spool are deficient to some extent in respect to all of the requirements enumerated above. Other detent means, such as spring clips, which make line contact with the spool must be tailored to get uniform characteristics in disengagement, thus increasing production costs. They also have a finite life, and they apply side loads against the spool. Those detent means that employ an elastomeric ring for holding the spool lack the sensitivity required, because the elastomeric rings are temperature sensitive, and the properties of the elastomeric rings during initial manufacture may differ from one batch to the next. They also are subject to wear so as to vary their disengagement characteristics as well as to limit their lives.

With respect to all of the prior art detent means, it is the general practice to mount them so that they can make direct engagement with the spool, and to accomplish this mode of operation, the detent means are located in flow passageways into which the ends of the spools can be shifted. When in these locations the detent means partially obstruct the flow of the hydraulic fluid through these passageways and thereby create undesirable pressure drops.

DISCLOSURE OF INVENTION

The present invention provides an improved solenoid operated valve with detent means of a type and arrangement that has overcome the aforesaid inadequacies of the prior art.

One of the features of the present invention is that it is constructed and arranged so that the detent means is mounted in a fixed position with respect to the valve body member and is positioned on the solenoid pin rather than the spool for retaining the solenoid pin against axial movement when the solenoid has moved the pin and the spool to the selected position of the spool. Thus, the detent means functions to retain the solenoid pin in place against axial movement after the solenoid has been deenergized, and thereby, the spool is retained in the desired position. By virtue of this construction and arrangement several benefits are derived, one of which is that the spools that are used can be standard production items of the type that are used in various other valves which don't utilize detents, and such usage may be made without any modification of the standard spools. Further, this feature eliminates the need for mounting the detent means in a location where they may create an obstruction in one of the flow passageways for flow of hydraulic fluid.

Another related feature of the present invention is that the detent means can be mounted directly within the front end plug of the solenoid through which the solenoid pin must slide axially, and thereby, the detent means will not constitute an obstruction in any passageway of the valve, and it will also permit use of standardized valve bodies without requiring special machining operations of the valve body for retaining the detent means in a fixed position relative to the end of the spool.

Still another feature of the present invention is the unique construction and arrangement of the detent means and the solenoid pin. In a preferred embodiment, a groove can be formed in the solenoid pin so as to provide a circumferential groove that has a cylindrical base and an inclined ramp which extends from the base to the outer circumference of the solenoid pin. The detent means includes split detent sleeves having inner circumferences that are shaped to fit against the surfaces of the base and ramp of the groove, and spring means extend around the split sleeves urging the sleeves together. Preferably, the split detent sleeves have circumferential grooves in their outer surfaces, and the spring means is a C-shaped spring located in the circumferential grooves clamping the sleeves against the solenoid pin. The angle of slope of the ramp with respect to the axis of the pin is of a magnitude to control the disengagement force that must be applied by the solenoid to release the detent. The latter is released when the pin is moved axially in a direction to cause the sleeves to separate against the action of the spring and to allow the sleeves to travel up the ramp onto the exterior circumference of the pin as will subsequently be understood when the details of the invention are described. The detent means will constantly apply forces toward the axis of the pin so that essentially no side loads are applied, and since the detent means makes no engagement with the spool, there are no side loads applied to the spool. Further, the detent means are constantly held together so that loose parts will not become a problem within the valve. Further, the disengagement force for disengaging the detent means will remain substantially constant even when wear occurs between the associated ramp surfaces or other surfaces that are subject to wear. The disengagement force can also be predetermined by selecting an angle of inclination of the ramp that meets the disengagement-force requirements of the particular valve. Generally, an inclination of approximately 6° with respect to the axis of the solenoid pin is found to be highly desirable. Still further, the detent means of the type embodying the present invention is found to have an infinite life which will surpass the life of the valve per se.

Other objects of this invention will appear in the following description and appended claims, reference being had to the accompanying drawings forming a part of this specification wherein like reference characters designate corresponding parts in the several views.

BRIEF DESCRIPTION OF THE DRAWING

FIG. 1 is a fragmentary front elevational view of a solenoid operated directional valve with a portion of the valve shown as an axial cross section;

FIG. 2 is an enlarged fragmentary section of the portion of the valve shown at the line 2 in FIG. 1; and FIG. 3 is a transverse section taken on the lines 3—3 of FIG. 2.

DESCRIPTION OF THE PREFERRED EMBODIMENT

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. The solenoid operated directional valve 10 has a valve body 12 on which is mounted a junction box 14 and solenoids 16 and 18.

The valve body 12 has a conventional pressure port 20 through which hydraulic fluid can be supplied to the passageway 22, tank ports 24 and 26 for discharge of hydraulic fluid from the passageways 28 and 30 to tank, and ports 32 and 34 for supplying working fluid under pressure or for returning working fluid from hydraulically driven apparatus, such as hydraulic cylinders, and the like. For this purpose the ports 32 and 34 are in communication with the passageways 36 and 38 of the valve body 12. The valve body 12 is in general a conventional construction and other arrangements can be provided for passageways for the hydraulic fluid. Mounted within the valve body 12 is a conventional valve spool 40 which has opposite ends 42 and 44 which are adapted to be engaged to their terminal ends by the solenoid pins 46 and 48 of the solenoids 16 and 18, respectively. In the conventional manner, energizing the solenoid 18 will cause the solenoid pin 48 to be moved axially to the left so that the spool 40 is moved to the illustrated position allowing hydraulic fluid to enter the valve body 12 through the port 20 and to pass through passageways 22 and 36 to port 32. At the same time, a return fluid can flow from a work station to port 34, and from there via passageways 38 and 30 to tank port 26.

Detent means 50 and 52 are provided for cooperation in holding the spool 40 in selected positions after deenergizing of the solenoids 16 and 18 has occurred. In the form of the invention in FIG. 1, the detent means 52 will hold the solenoid pin 48 in the illustrated position, and thereby, the spool 40 will be retained in this selected position even after the solenoid 18 has been deenergized. When it is desired to shift the spool to the opposite position of its stroke, the solenoid 16 will be energized, and the solenoid pin 46 will then exert an axial thrust against the spool 40 in an amount sufficient to cause the detent means 52 to open, after which the spool and the two solenoid pins 46 and 48 will be shifted axially to the right until such time as the solenoid pin 46 is retained by the detent means 50. Thereafter, solenoid 16 can be deenergized and the spool 40 will be held in the selected position to the right, wherein hydraulic fluid can be supplied from the pressure port 20 to the port 34, and at the same time, hydraulic fluid can be returned via the port 32 for passage to the tank via port 24.

Referring now particularly to FIGS. 2 and 3, the specific details of detent means 52 will be described. As there shown, the solenoid pin 48 has a groove 54 extending around its circumference shaped to provide a cylindrical base 56 and a ramp 58 which is inclined in the direction of the spool and extends from the base 56 to the outer circumference 60 of the solenoid pin. The detent means 52 includes split detent sleeves 62 and 64 which have inner surfaces 66 and 68 which are shaped to fit against the surfaces of the base 56 and ramp 58 of the solenoid pin 48. The split sleeves have circumferential grooves 70 and 72 in their outer surfaces, and a C-shaped spring 74 constitutes a spring means for clampingly engaging the split sleeves 62 and 64 against the solenoid pin 48.

In the illustrated embodiment of the invention the detent means 52 is mounted in the front end plug 76 of the solenoid 18, and it is retained therein against axial displacement by the conventional spool stop 78. Thus, the detent means 52 is retained in a stationary position relative to the valve body member 12 at a location away from the passageway 30 so as not to interfere with the flow of hydraulic fluid therethrough, but by virtue of its holding action of the solenoid pin 48, it can be utilized effectively to retain the spool 40 in a selected position after the solenoid 18 has been deenergized.

For the purpose of setting the magnitude of the disengagement force that must be applied by solenoid 16 for shifting the spool and the two solenoid pins 46 and 48 to the right, either of two procedures can be utilized, one being to provide a desired strength of the C-shaped spring 74, and the other being to select an appropriate angle of the ramp 58 relative to the axis of the pin 48. An angle of inclination for this purpose that has been found to be very well suited is 6°.

It is claimed:

1. A solenoid operated valve having a valve body member provided with passageways for directing flow of hydraulic fluid, a spool mounted for movement in said valve body member and operatively associated with said passageways and movable to selected positions for controlling flow of hydraulic fluid through the passageways, a solenoid mounted on said valve body member in alignment with said spool, and a solenoid pin responsive to said solenoid for movement axially to shift said spool to a selected position, characterized in that a detent means is mounted in a fixed position with respect to said valve body member and positioned on said solenoid pin for retaining the latter against axial movement when the solenoid has moved said pin and the spool to said selected position of the spool, said solenoid pin has a groove extending around its circumference shaped to provide a cylindrical base and a ramp, said ramp being inclined toward said spool and extending from said base to the outer circumference of the solenoid pin, and said detent means includes a pair of split detent sleeves of similar shape having inner surfaces shaped to fit against the surfaces of the base and ramp of said groove and spring means urging said sleeves together, said spring means being a C-shaped spring seated on the radially outer surfaces of said split detent sleeves.

2. A solenoid operated valve having a valve body member provided with passageways for directing flow of hydraulic fluid, a spool mounted for movement in said valve body member and operatively associated with said passageways and movable to selected positions for controlling flow of hydraulic fluid through the passageways, a solenoid mounted on said valve body member in alignment with said spool, and a solenoid pin responsive to said solenoid for movement axially to shift said spool to a selected position, characterized in that a detent means is mounted in a fixed position with respect to said valve body member and positioned on said solenoid pin for retaining the latter against axial movement when the solenoid has moved said pin and the spool to said selected position of the spool, said solenoid pin has a groove extending around its circumference shaped to provide a cylindrical base and a ramp, said ramp being inclined toward said spool and extending from said base to the outer circumference of the solenoid pin, said detent means includes split detent sleeves having inner surfaces shaped to fit against the surfaces of the base and ramp of said groove and spring means urging said sleeves together, said split detent sleeves have circumferential grooves in their outer surfaces, and said spring means is a C-shaped spring located in said circumferential grooves clampingly engaging said sleeves.

3. The valve that is defined in claim 2, characterized in that the slope of said ramp with respect to the axis of said pin is approximately 6°.

4. A solenoid operated directional valve having a valve body member provided with passageways for directing flow of hydraulic fluid in a plurality of directions, a spool mounted for movement in said valve body member and operatively associated with said passageways and movable to selected positions with respect thereto for controlling the flow of hydraulic fluid through the passageways, solenoids mounted on said valve body member at opposite ends thereof in alignment with said spool, and solenoid pins operatively associated with said solenoids and responsive to said solenoids for movement axially to shift said spool to selected positions, characterized in that separate detent means are mounted in fixed positions with respect to said valve body member and positioned respectively on each of said solenoid pins for retaining one of the latter against axial movement when one of the solenoids has moved its associated pin and the spool to a selected position of the spool, each detent means including a pair of split detent sleeves shaped to provide split ramps for engagement with a surface of said solenoid pin, and a C-shaped spring clampingly engaging said split detent sleeves for urging said split detent sleeves against said solenoid pin, said solenoid pin having an opposing ramp for engagement by the split ramps of said split detent sleeves when the solenoid pin is in its retained axial position corresponding to a selected position of the spool, the ramps being inclined so that the solenoid pin can be moved axially in one direction from its retained position to release the detent means from axially retaining the solenoid pin.

5. A solenoid operated valve having a valve body provided with passageways for directing flow of hydraulic fluid, a spool member mounted for movement in said valve body and operatively associated with said passageways and moveable to selected positions for controlling flow of hydraulic fluid through the passageways, a solenoid mounted on said valve body in alignment with said spool member, a solenoid pin member responsive to said solenoid for movement axially to shift said spool member to a selected position, a detent means mounted in a fixed position with respect to said valve body and operatively positioned for retaining the spool member against axial movement when the solenoid has moved said pin member and the spool member in one axial direction to said selected position of the spool member, characterized in that one of said members has a groove extending around its circumference shaped to provide a cylindrical base and a ramp, said ramp being inclined in said one direction and extending from said base to an outer circumference of said one member, and said detent means includes split detent sleeves having inner surfaces shaped to fit against the surfaces of the base and ramp of said groove and spring means urging said sleeves together, said spring means being a C-shaped spring seated on the radially outer circumference of said sleeves and clampingly engaging said sleeves.

6. A solenoid operated valve having a valve body provided with passageways for directing flow of hydraulic fluid, a spool member mounted for movement in said valve body and operatively associated with said passageways and moveable to selected positions for controlling flow of hydraulic fluid through the passageways, a solenoid mounted on said valve body in alignment with said spool member, a solenoid pin member responsive to said solenoid for movement axially to shift said spool member to a selected position, and a detent means mounted in a fixed position with respect to said valve body and operatively positioned for retaining the spool member against axial movement when the solenoid has moved said pin member and the spool member in one axial direction to said selected position of the spool member, characterized in that one of said members has a groove extending around its circumference shaped to provide a cylindrical base and a ramp, said ramp being inclined in said one direction and extending from said base to an outer circumference of said one member, said detent means includes split detent sleeves having inner surfaces shaped to fit against the surfaces of the base and ramp of said groove and spring means urging said sleeves together, said split detent sleeves have circumferential grooves in their outer surfaces, and said spring means in a C-shaped spring located in said circumferential grooves clampingly engaging said sleeves.

7. The valve that is defined in claim 6, characterized in that the slope of said ramp with respect to the axis of said one member is less than 7°.

* * * * *